US012583753B2

(12) United States Patent (10) Patent No.: US 12,583,753 B2
Okada et al. (45) Date of Patent: Mar. 24, 2026

(54) POROUS AMORPHOUS SILICON, METHOD FOR PRODUCING POROUS AMORPHOUS SILICON, AND SECONDARY BATTERY

(71) Applicant: TOHOKU UNIVERSITY, Sendai (JP)

(72) Inventors: Junpei Okada, Sendai (JP); Koji Nakayama, Sendai (JP); Takeshi Wada, Sendai (JP)

(73) Assignee: Tohoku University, Sendai (JP)

( * ) Notice: Subject to any disclaimer, the term of this patent is extended or adjusted under 35 U.S.C. 154(b) by 1077 days.

(21) Appl. No.: 17/042,770

(22) PCT Filed: Sep. 13, 2019

(86) PCT No.: PCT/JP2019/036199
§ 371 (c)(1),
(2) Date: Sep. 28, 2020

(87) PCT Pub. No.: WO2020/194794
PCT Pub. Date: Oct. 1, 2020

(65) Prior Publication Data
US 2021/0371288 A1 Dec. 2, 2021

(30) Foreign Application Priority Data
Mar. 26, 2019 (JP) ................................. 2019-059323

(51) Int. Cl.
*C01B 33/021* (2006.01)
*C21D 9/52* (2006.01)
(Continued)

(52) U.S. Cl.
CPC .............. *C01B 33/021* (2013.01); *C21D 9/52* (2013.01); *C22C 21/02* (2013.01);
(Continued)

(58) Field of Classification Search
CPC ................................. C22C 21/05; C22C 21/02
See application file for complete search history.

(56) References Cited

U.S. PATENT DOCUMENTS

2004/0214085 A1 10/2004 Sheem et al.
2014/0272578 A1* 9/2014 Xiao ................... H01M 10/052
423/348
(Continued)

FOREIGN PATENT DOCUMENTS

CN 1518144 A 8/2004
JP H08-048512 A 2/1996
(Continued)

OTHER PUBLICATIONS

KR20180017794A—machine translation (Year: 2018).*
(Continued)

*Primary Examiner* — Haroon S. Sheikh
(74) *Attorney, Agent, or Firm* — Oliff PLC

(57) ABSTRACT

A porous amorphous silicon which enables improvement in battery performances such as charge/discharge efficiency and battery capacity when used as the anode material; a method for producing a porous amorphous silicon, capable of producing a porous amorphous silicon composed entirely of amorphous silicon at relatively low cost in a short time; and a secondary battery using the porous amorphous silicon as the anode material. A molten metal containing metal and silicon is cooled at a cooling rate of $10^6$ K/sec or more to form an eutectic alloy including the metal and the silicon, and then the metal is selectively eluted from the eutectic alloy with an acid or an alkali to obtain a porous amorphous silicon. The porous amorphous silicon has a lamellar or columnar structure having a mean lamellar diameter or a mean column diameter of 1 nm to 100 nm.

17 Claims, 6 Drawing Sheets

(51) Int. Cl.
    *C22C 21/02*     (2006.01)
    *H01M 10/0525*     (2010.01)
    *H01M 10/36*     (2010.01)

(52) U.S. Cl.
    CPC ....... *H01M 10/0525* (2013.01); *H01M 10/36* (2013.01); *C01P 2002/02* (2013.01); *C01P 2002/74* (2013.01); *C01P 2004/03* (2013.01); *C01P 2004/04* (2013.01)

(56) References Cited

U.S. PATENT DOCUMENTS

2015/0050556 A1*   2/2015   Liu ....................... H01M 4/134
                                                216/13
2015/0295235 A1   10/2015   Kim et al.

FOREIGN PATENT DOCUMENTS

| | | | |
|---|---|---|---|
| JP | 3827642 | B2 | 9/2006 |
| JP | 2010-135336 | A | 6/2010 |
| JP | 2012-082125 | A | 4/2012 |
| JP | 2012-082126 | A | 4/2012 |
| JP | 2013-193933 | A | 9/2013 |
| JP | 2018-190563 | A | 11/2018 |
| JP | 2019-014917 | A | 1/2019 |
| KR | 10-2015-0117545 | A | 10/2015 |
| KR | 20180017794 | A * | 2/2018 |

OTHER PUBLICATIONS

JP201393933—NPL (Year: 2013).*
Lin. "Mesoporous Amorphous Silicon: A Simple Synthesis of a High-Rate and Long-Life Anode Material for Lithium-Ion Batteries". (Year: 2016).*
Dec. 1, 2020 Office Action issued in Japanese Patent Application No. 2020-539108.
Kasavajjula et al., "Nano- and bulk-silicon-based insertion anodes for lithium-ion secondary cells," Journal of Power Sources, 2007, vol. 163, pp. 1003-1039.
Wang et al., "Two-Phase Electrochemical Lithiation in Amorphous Silicon," Nano Letters, 2013, vol. 13, pp. 709-715.
Magasinski et al., "High-performance lithium-ion anodes using a hierarchical bottom-up approach," Nature Materials, Apr. 2010, vol. 9, pp. 353-358.
Shao et al., "An Analysis of the Formation of Bulk Amorphous Silicon from the Melt," Metallurgical and Materials Transactions A, Jul. 1998, vol. 29A, pp. 1825-1828.
Lin et al., "Mesoporous Amorphous Silicon: A Simple Synthesis of a High-Rate and Long-Life Anode Material for Lithium-Ion Batteries," Angewandte Chemie International Edition, 2016, vol. 55, pp. 14063-14066.
Jiang et al., "An Easy Way for Preparing High Performance Porous Silicon Powder by Acid Etching Al—Si Alloy Powder for Lithium Ion Battery," Electrochimica Acta, 2014, vol. 115, pp. 393-398.
Jmirov et al., "Microstructure and Electrochemical Properties of Rapidly Solidified Si—Ni Alloys as Anode for Lithium- Ion Batteries," Journal of Industrial and Engineering Chemistry, 2019, vol. 71, pp. 351-360.
Suzuki et al., "Formation and Crystallization of Al—Fe—Si Amorphous Alloys," Journal of Materials Science, 1983, vol. 18, pp. 1195-1201.
Apr. 20, 2022 Extended Search Report issued in European Patent Application No. 19921439.6.
Dec. 7, 2023 Office Action issued in Chinese Patent Application No. 201980017973.7.
B. Tatar et al. "Improvement in electrical and photovoltaic properties of a-Si/c-Si heterojunction with slanted nano-columnar amorphous silicon thin films for photovoltaic applications" Current Applied Physics, vol. 15, Feb. 7, 2015, pp. 511-519.

* cited by examiner (a)

(b)

(c)

(d)

（a）

（b）

（c）

（a）

（b）

(a)                              (b)

(a)                              (b)

POROUS AMORPHOUS SILICON, METHOD FOR PRODUCING POROUS AMORPHOUS SILICON, AND SECONDARY BATTERY

FIELD OF THE INVENTION

The present invention relates to porous amorphous silicons, methods for producing porous amorphous silicons, and secondary batteries.

DESCRIPTION OF RELATED ART

To realize a sustainable society with environmental friendliness, utilization of renewable energies is important. However, the renewable energies accounted for no more than 14.5% of the power supply constitution in Japan in 2016. The reason for this is that the amount of the powers generated from solar and wind depends on season and weather, which easily changes the balance between demand and supply, thus failing to be achieved a stable power supply. In order for the renewable energies to be a stable main power supply, the technological development of power storages is the most important issue, and it is no exaggeration to say that the achievement of high performance and cost reduction of storage batteries for this purpose is the key to be a renewable energy in the future.

Lithium ion batteries (liquid lithium ion batteries) using liquid electrolytes already in practical use have a global market size of about 1.1 trillion yen in the fiscal year 2016, and are steadily increasing due to a social tailwind for the realization of a low-carbon society. Lithium ion batteries (all-solid-state batteries) using a solid electrolyte exhibit much higher electrochemical stability than that of liquid lithium ion batteries, and the high energy density of cells can be achieved by applying high potential electrode active materials. Because of having both flame retardance and high temperature resistance, the storage batteries for electric vehicles are capable of significantly reducing the number of safety components in battery pack, and thus the cost reduction can be expected. Meanwhile, the development of all-solid-state batteries is still underway, and there is a need to develop electrolyte materials with high ion conductivity, reduce the interfacial resistance between the electrode active material and the electrolyte, and develop high-performance cathode and anode materials.

For both liquid lithium ion batteries and all-solid-state batteries, carbon-based active materials are used as the anode material, and the specific capacity is about 370 mAh/g. Meanwhile, when silicon is used as the anode material, the theoretical specific capacity increases to about 4,200 mAh/g (see, for example, Non-Patent Literature 1), so that the capacity can be expected to be increased up to about 11 times. $Li/Li^+$ has a low operating potential of 0.5 V and the Si element is naturally abundant. Therefore, if silicon can be utilized as the anode material for lithium ion batteries, there is a possibility that the cruising distance of electric vehicles can be significantly extended and smartphones can be used for extended periods of time.

However, alloying ($Si+4.4Li \rightarrow Li4.4Si$) of the silicon electrode in the lithium ion battery proceeds due to the reaction associated with the insertion of Li during the charging process and thus the volume expansion to about 4 times occurs. This expansion causes the breakage of the electrode, and the battery capacity is reduced to half or less after about 10 charge/discharge cycles. As compared with the anode material composed of a conventional carbon-based active material, while the silicon electrode has a higher specific capacity, it has extremely short lifetime due to the pulverization caused by the volume changes.

To solve the problem of electrode breakages, there have been proposed technologies of using, as the anode material, thin films and particles of amorphous silicon, which are less likely to be broken even by alloying associated with the insertion of Li and have excellent mechanical properties (see, for example, Non-Patent Literatures 2 and 3).

There has been a proposed theory for the formation of amorphous silicon, based on the thermodynamic consideration that, when the liquid silicon is supercooled by 243 K from the melting point, the free energy of amorphous silicon becomes lower than that of liquid silicon. Therefore, the amorphous silicon may spontaneously form from silicon supercooled by 243 K (see, for example, Non-Patent Literature 4).

To prevent electrode breakages more effectively, the electrode made of the amorphous silicon may be composed of porous particles. In other words, since many voids are formed inside the porous particles, if the electrode made of the amorphous silicon can be composed of porous particles, the volume of the voids will become a gap during the volume expansions by alloying with Li, and thus the pulverization of the electrode can be more effectively prevented.

Examples of a conventional method for producing porous particles partially including amorphous silicon include a method in which a molten alloy containing at least one or more elements M of Sn, Al, Pb, In, Ni, Co, Ag, Mn, Cu, Ge, Cr, Ti and Fe, and Si is rapidly cooled at 100 K/sec to $1 \times 10^5$ K/sec to form a rapidly cooled alloy, and then the element M contained in the rapidly cooled alloy is removed by eluting with an acid or an alkali in which the element M is soluble, thus obtaining an aggregate of porous particles, which is composed of Si and partially includes an amorphous phase (see, for example, Patent Literature 1); and a method in which silicon tetrachloride ($SiCl_4$) is reacted with Mg using a solvothermal method to form Si and $MgCl_2$, and after performing a heat treatment and rapid quenching, $MgCl_2$ is eliminated to produce amorphous silicon having a porous structure (see, for example, Non-Patent Literature 5).

Generally, in the solidification of an alloy, while primary dendrites grow, secondary dendrites grow in the direction vertical thereto to form dendritic crystals. When the cooling rate of the solidification increases, the entire dendrites become smaller and the generation of primary dendrite arms is also suppressed, thus narrowing the secondary dendrite spacing. If the dendrite arm spacing (DAS) becomes narrower, eutectic crystals and compounds distributed in the gap become smaller to obtain a fine structure in the entire alloy. DAS ($\mu m$) particularly depends on the cooling rate V (K/sec) and follows a relationship of formula (1):

$$DAS = aV^{-n} \tag{1}$$

where "a" is a constant determined by the alloy and is generally 10 to 100, and "n" is about 0.3 regardless of the alloy.

The present inventors have developed an apparatus and a method for producing a single micro metal powder by a gas atomization method capable of the stably mass-production of spherical metal powders having small particle diameter, high purity and high melting point (see, for example, Patent Literature 2).

CITATION LIST

Non-Patent Literature 1: U. Kasavajjula et al., "Nano- and bulk-silicon-based insertion anodes for lithium-ion secondary cells", Journal of Power Sources, 2007, 163, p. 1003

3

Non-Patent Literature 2: J. W. Wang et al., "Two-Phase Electrochemical Lithiation in Amorphous Silicon", Nano Letters, 2013, 13, p. 709

Non-Patent Literature 3: Magasinski et al., "High-performance lithium-ion anodes using a hierarchical bottom-up approach", Nature Materials, 2010, 9, p. 353

Non-Patent Literature 4: Shao et al., "An Analysis of the Formation of Bulk Amorphous Silicon from the Melt", Metallurgical and Materials Transactions A, 1998, 29A, p. 1825

Non-Patent Literature 5: Liangdong Lin et al., "Mesoporous Amorphous Silicon: A Simple Synthesis of a High-Rate and Long-Life Anode Material for Lithium-Ion Batteries", Angew. Chem. Int. Ed., 2016, 55, p. 14063-14066

Patent Literature 1: JP-B 1-3827642

Patent Literature 2: JP-A-2019-14917

SUMMARY OF THE INVENTION

In Non-Patent Literature 2, an amorphous silicon thin film having mechanical properties better than those of crystalline silicon is used as the anode material. However, there was a problem that it takes time to produce the amorphous silicon thin film, and therefore it is difficult to mass-produce it. For example, an amorphous silicon film can be produced by laminating through sputtering in an argon atmosphere. However, the general growth rate of a thin film is 1 nm/sec and it takes about 1.5 hours to fabricate an amorphous layer of several microns on a wafer level area. Therefore, economic consideration forces the use of an insufficiently grown amorphous silicon thin film as the anode material, thus causing a problem that the content of Si contributing to battery charge/discharge decreases leading to degradation of the charge/discharge efficiency.

In Non-Patent Literature 3, the amorphous silicon particles, which are used as the anode material, are fabricated by the vapor phase growth method using a silane gas ($SiH_4$). The production of these amorphous silicon particles requires an expensive production system with the control device, and also the process is complicated and material cost is high, thus leading to high production cost. For this reason, the technology of Non-Patent Literature 3 has not been economically scaled up for mass production.

Non-Patent Literature 4 proposes a thermodynamic theory relating to a method for producing the amorphous silicon from silicon in supercooled liquid states. There have been no reported cases of the successful fabrication of the amorphous silicon by rapid quenching based on this theory.

The size of the structure constituting silicon porous particles conforms to DAS in formula (1), and in the case of a crystal phase, for example, a=10, the cooling rate of $10^6$ K/sec or more is required to obtain DAS of 100 nm or less. To obtain porous particles of the amorphous silicon having a finer structure, more higher cooling rate is required. In the method for producing porous particles as mentioned in Patent Literature 1, the cooling rate during the formation of the alloy is about $10^5$ K/sec, leading to a problem that the amorphous silicon is only partially formed, thus failing to obtain porous particles composed entirely of the amorphous silicon. Particularly, an Al—Si alloy had a problem that only an Al single phase and an Si single phase of a crystalline phase can be obtained.

In the method for producing the amorphous silicon mentioned in Non-Patent Literature 5, since a solvothermal method is used, the devices such as the autoclave as well as the strict temperature and pressure controls are required, leading to a problem such as a high production cost. In the method of Non-Patent Literature 5, since the solvothermal method is used, no lamellar structures are formed.

The present invention has been made focusing on those problems, and it is an object of the present invention to provide a porous amorphous silicon which enables improvement in battery performances such as charge/discharge efficiency and battery capacity when used as the anode material; a method for producing a porous amorphous silicon, which is capable of producing a porous amorphous silicon composed entirely of amorphous silicon at relatively low cost in a short time; and a secondary battery using the porous amorphous silicon as the anode material.

To attain the above objects, the present inventors have intensively studied by making use of self-developed technology for fabricating a single micro metal powder using the gas atomization method mentioned in Patent Literature 2, finding on rapid solidification of a metallic silicon alloy, and observational technology of a fine structure using an electron microscope, and thus the present invention has been completed.

The porous amorphous silicon according to the present invention has a lamellar or columnar structure having a mean lamellar diameter or a mean column diameter of 1 nm to 100 nm. The porous amorphous silicon according to the present invention preferably has a lamellar structure having a spacing between adjacent lamellae of 1 nm to 100 nm or a columnar structure having a spacing between adjacent columns of 1 nm to 100 nm.

The method for producing a porous amorphous silicon according to the present invention comprises cooling a molten metal containing metal and silicon at a cooling rate of $10^6$ K/sec or more to form an eutectic alloy comprising the metal and the silicon, and selectively eluting the metal from the eutectic alloy with an acid or an alkali to obtain a porous amorphous silicon.

The method for producing a porous amorphous silicon according to the present invention is capable of suitably producing the porous amorphous silicon according to the present invention. It becomes possible for the method for producing a porous amorphous silicon according to an embodiment of the present invention to adjust a domain size of a silicon phase in the structure of the eutectic alloy in a range of 1 nm to 100 nm by cooling a molten metal containing metal and silicon at a cooling rate of $10^6$ K/sec or more when an eutectic metal is formed. The selective elution of the metal from this eutectic alloy makes it possible to produce a porous amorphous silicon according to an embodiment of the present invention which has a lamellar or columnar structure having a mean lamellar diameter or a mean column diameter of 1 nm to 100 nm. It also becomes possible for the method for producing a porous amorphous silicon according to the present invention to adjust a domain size of a metal phase in the structure of the eutectic alloy in a range of 1 nm to 100 nm. In this case, it is possible to produce the porous amorphous silicon according to the present invention which has a lamellar structure having a spacing between adjacent lamellae of 1 nm to 100 nm or a columnar structure having a spacing between adjacent columns of 1 nm to 100 nm.

The method for producing a porous amorphous silicon according to the present invention is capable of producing a porous amorphous silicon composed entirely of amorphous silicon by cooling a molten metal at a cooling rate of $10^6$ K/sec or more. Further increase in cooling rate enables the domain size of a silicon phase in the structure of the eutectic alloy to be reduced to a range of 1 nm to 50 nm, thus producing a porous amorphous silicon having a mean lamellar diameter or a mean column diameter of 1 nm to 50 nm.

Since the method for producing a porous amorphous silicon according to the present invention comprises the steps of rapid quenching of a molten metal and eluting metal with an acid or an alkali, a porous amorphous silicon can be produced at relatively low costs in a short time without using an expensive device. Silicon having the highest Clarke number excluding oxygen is used as the material, and a porous amorphous silicon can be produced at low cost by using metal having higher Clarke number, such as aluminum. Therefore, it is easy to economically scale up for mass production.

Since the porous amorphous silicon according to the present invention is composed of a sufficiently grown porous amorphous silicon, it is possible to improve battery performances such as charge/discharge efficiency and battery capacity when used as the anode material. The porous amorphous silicon according to the present invention preferably has a bicontinuous structure. It is preferable that the porous amorphous silicon according to the present invention is amorphous silicon having a three-dimensional network structure and also includes continuous pores. The ratio of silicon is preferably 90% or more in terms of a ratio of an element excluding oxygen.

When the porous amorphous silicon according to the present invention is used as the anode material for lithium ion batteries, even if silicon is alloyed with lithium to cause volume expansion, there is almost no change in appearance because expansion occurs to fill pores. Amorphous is free from dislocation defects and grain boundaries and produces uniform stress dispersion under mechanical stress loadings, so that the porous amorphous silicon of the present invention can have both high strength and high elasticity compared to a crystalline substance, and is resistant to the volume expansion when the silicon is alloyed with the lithium. As mentioned above, when the porous amorphous silicon according to the present invention is used as the anode material for lithium ion batteries, it is possible to prevent the anode material from being pulverized. The porous amorphous silicon according to the present invention is not limited to the anode material for lithium ion batteries, and can also be used as thermoelectric materials, solar batteries, electronic device members, filter materials and optical materials.

In the method for producing a porous amorphous silicon according to the present invention, the eutectic alloy may be produced by any method as long as it is a method of performing rapid quenching. For example, the eutectic alloy may be produced by a single roll rapid quenching method or a twin roll rapid quenching method and may have a ribbon or foil shape having a mean thickness of 0.1 μm to 1 mm, or may be produced by a gas atomization method or a water atomization method and may have a powder shape having a mean particle diameter of 10 nm to 30 μm.

In the method for producing a porous amorphous silicon according to the present invention, the eutectic alloy may be any one as long as it is an eutectic alloy containing metal and Si, and may be, for example, an Al—Si alloy. In this case, the eutectic alloy preferably contains an atomic percentage of Si between 1% to 50%, thus making it possible to produce a porous amorphous silicon having a mean porosity of 50% to 99%. The eutectic alloy may be an Fe—Si alloy, an Ni—Si alloy, a Cr—Si alloy, an Ag—Si alloy or a Cu—Si alloy. In this case, the eutectic alloy preferably contains an atomic percentage of Si between 50% to 90%, thus making it possible to produce a porous amorphous silicon having a mean porosity of 10% to 50%. The porosity as used herein means the content (atomic percentage) in the eutectic metal of the compound eluted selectively from the eutectic metal. For example, when all components excluding silicon are eluted from the eutectic metal, the following relationship is established: porosity (%)=content (atomic percentage) in the eutectic metal of the compound eluted selectively from the eutectic metal=100(%)−content (atomic percentage) of silicon in the eutectic metal.

The eutectic alloy may be a two- or multi-component eutectic alloy represented by $M_1$-Si ($M_1$ represents one or more elements selected from Al, Ag, As, Au, Be, Ca, Cr, Cu, Mg, Pd, Pt, Y, Co, Fe, Mn, Ti and Zr), or a three- or multi-component eutectic alloy represented by $M_2$-Al—Si ($M_2$ represents one or more elements selected from Ca, Cu, Ge, P, Mn, Na, Sb, Sn, Sc, Sr and Ti).

The anode material of the secondary battery according to the present invention is composed of the porous amorphous silicon according to the present invention.

The anode material of the secondary battery according to the present invention is composed of the porous amorphous silicon which has high specific capacity and is resistant to the volume expansion, and therefore has high battery capacity and satisfactory cycle properties. It is also possible to prevent the anode material from being pulverized due to electrode breakages.

According to the present invention, it is possible to provide a porous amorphous silicon which enables improvement in battery performances such as charge/discharge efficiency and battery capacity when used as the anode material; a method for producing a porous amorphous silicon, which is capable of producing a porous amorphous silicon composed entirely of amorphous silicon at relatively low cost in a short time; and a secondary battery using the porous amorphous silicon as the anode material.

7

(atomic %) through gas atomization using He gas, by the method for producing a porous amorphous silicon according to an embodiment of the present invention.

Figure 1:
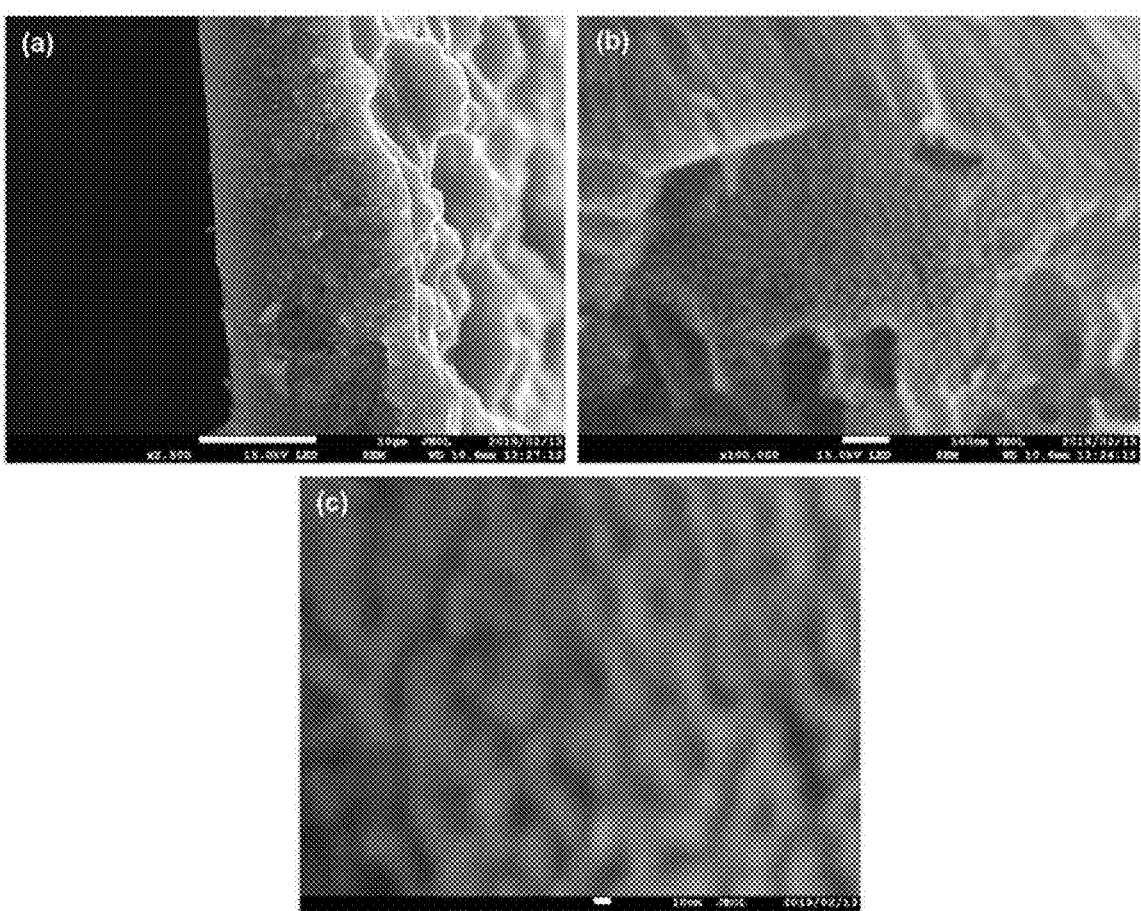
FIG. 1 includes (a) a scanning electron microscopic (SEM) photograph; (b) a SEM photograph taken at a higher magnification than that of (a); and (c) a SEM photograph taken at a higher magnification than that of (b); of a porous amorphous silicon produced using an Al—Si alloy, which is fabricated by mixing at a ratio of Si:Al=20:80 (atomic %) using a single roll rapid quenching method, by the method for producing a porous amorphous silicon according to an embodiment of the present invention.
Figure 4:
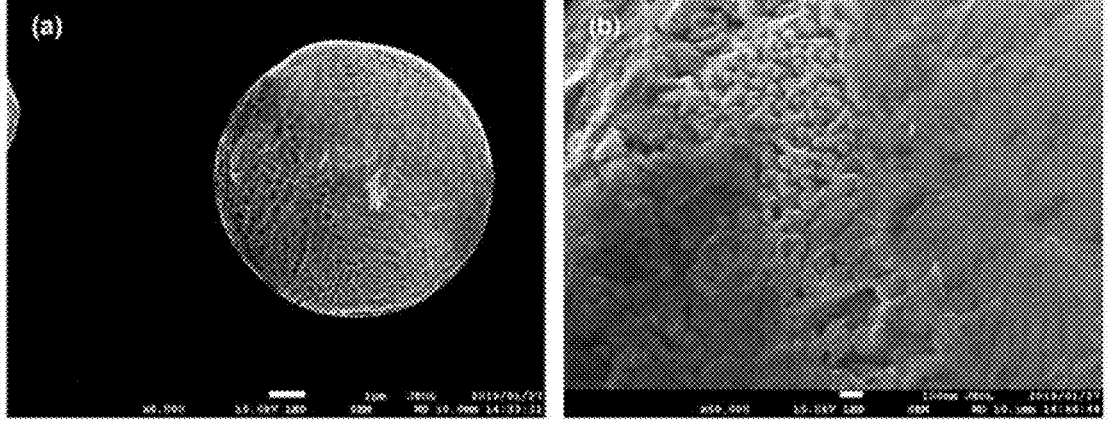
FIG. 4 includes (a) a scanning electron microscopic (SEM) photograph; and (b) a SEM photograph taken at a higher magnification than that of (a); of a porous amorphous silicon produced using an Al—Si—Ti alloy powder, which is fabricated by mixing at a ratio of Si:Al:Ti=19.5:79.5:1.0
Figures 5, 6:
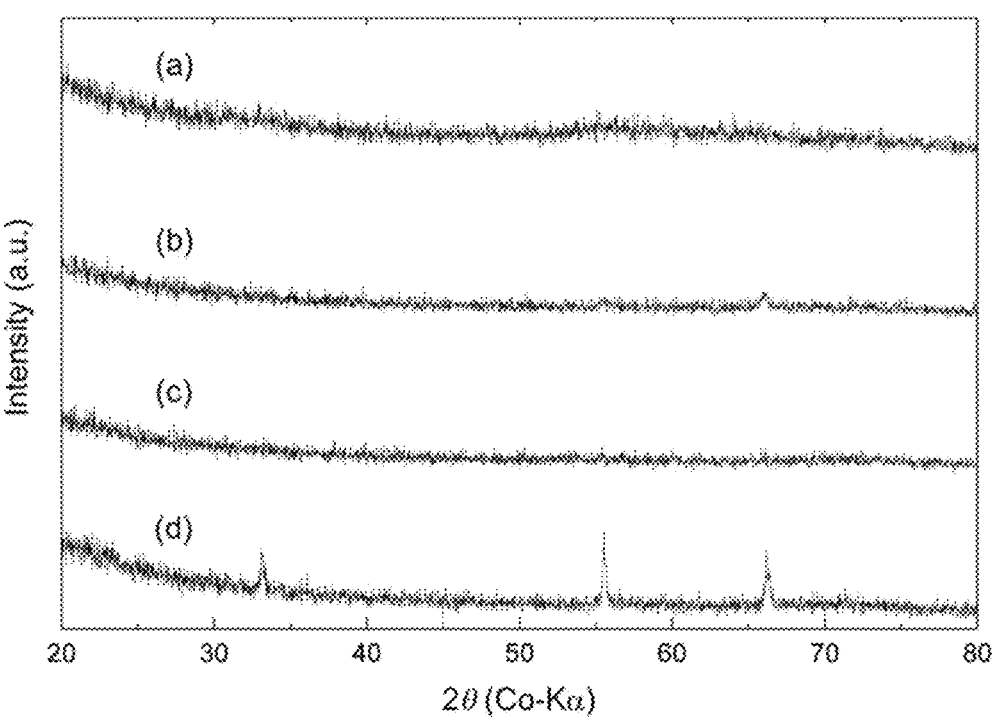

FIG. 5 illustrates XRD spectra of (a) the porous amorphous silicon shown in FIG. 1; (b) the porous amorphous silicon shown in FIG. 3; (c) the porous amorphous silicon shown in FIG. 4; and (d) a crystalline substance Si nanopowder of Comparative Example.

FIG. 6 includes (a) a scanning electron microscopic (SEM) photograph, (b) a SEM photograph taken at a higher magnification than that of (a); (c) a SEM photograph taken at a higher magnification than that of (b); and (d) a SEM photograph taken at a higher magnification than that of (c); of a porous amorphous silicon produced using an Al—Si alloy powder, which is fabricated by mixing at a ratio of Si:Al=3:97 (atomic %) through gas atomization using He gas, by the method for producing a porous amorphous silicon according to an embodiment of the present invention.

Figures 7, 8:
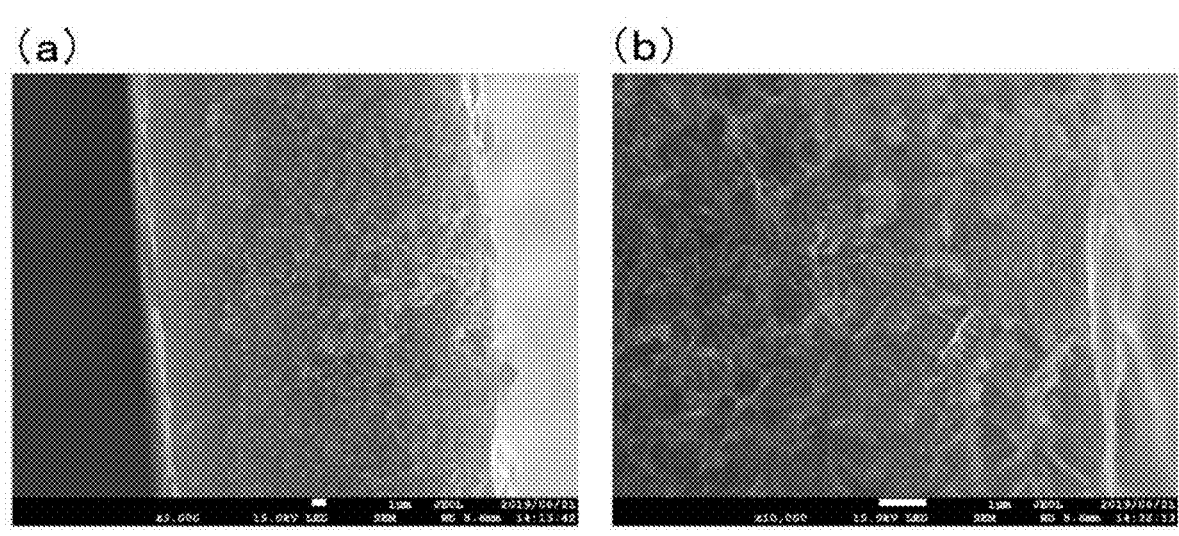

FIG. 7 includes (a) a scanning electron microscopic (SEM) photograph; (b) a SEM photograph taken at a higher magnification than that of (a); and (c) a SEM photograph taken at a higher magnification than that of (b); of a porous amorphous silicon produced using an Al—Si alloy powder, which is fabricated by mixing at a ratio of Si:Al=12.5:87.5 (atomic %) through gas atomization using Ar gas, by the method for producing a porous amorphous silicon according to an embodiment of the present invention.

FIG. 8 includes (a) a scanning electron microscopic (SEM) photograph; and (b) a SEM photograph taken at a higher magnification than that of (a); of a porous amorphous silicon produced using an Al—Si alloy powder, which is fabricated by mixing at a ratio of Si:Al=12.5:87.5 (atomic %) using a single roll rapid quenching method, by the method for producing a porous amorphous silicon according to an embodiment of the present invention.

Figure 9:
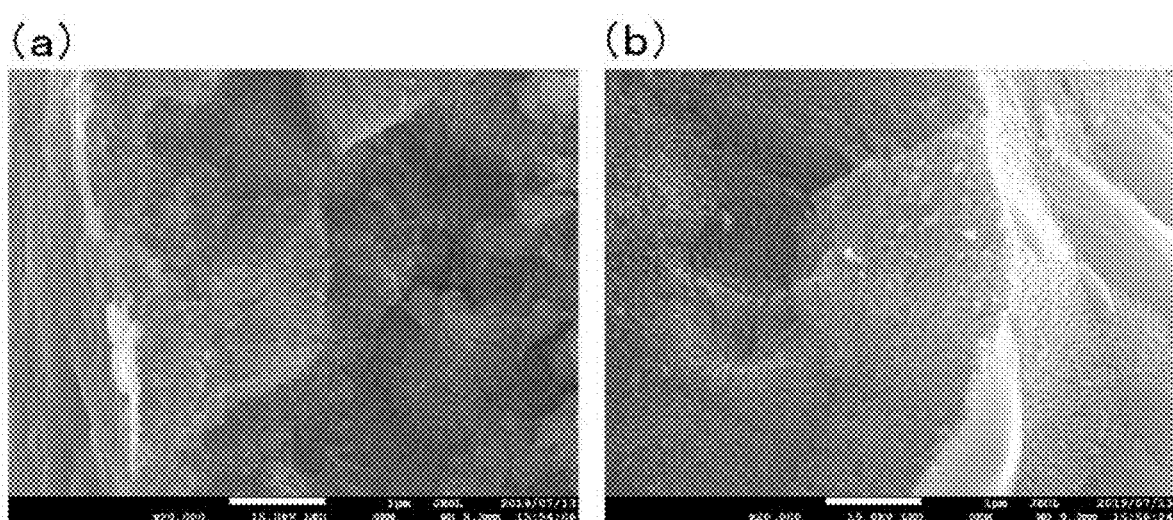

FIG. 9 includes (a) a scanning electron microscopic (SEM) photograph; and (b) a SEM photograph taken at a higher magnification than that of (a); of a porous amorphous silicon produced using an Al—Si alloy powder, which is fabricated by mixing at a ratio of Si:Al=30:70 (atomic %) using a single roll rapid quenching method, by the method for producing a porous amorphous silicon according to an embodiment of the present invention.

Figure 10:
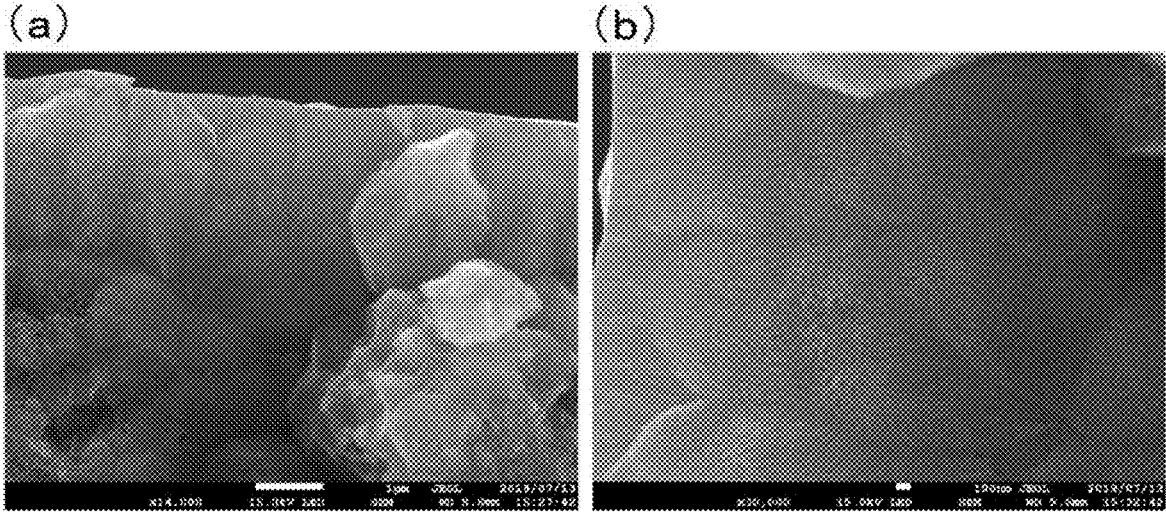

FIG. 10 includes (a) a scanning electron microscopic (SEM) photograph; and (b) a SEM photograph taken at a higher magnification than that of (a); of a porous amorphous silicon produced using an Al—Si alloy powder, which is fabricated by mixing at a ratio of Si:Al=40:60 (atomic %) using a single roll rapid quenching method, by the method for producing a porous amorphous silicon according to an embodiment of the present invention.

Figure 11:
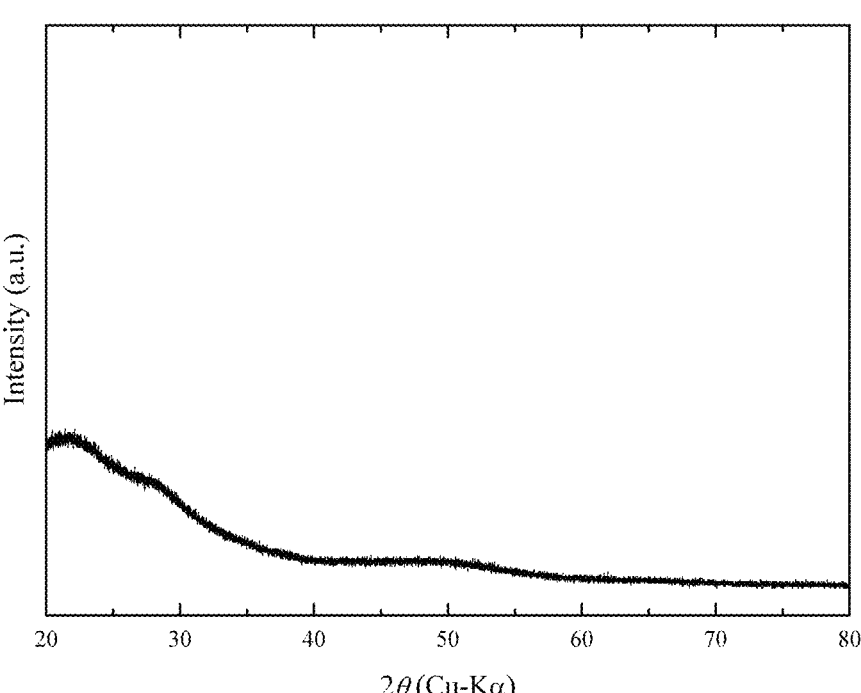

FIG. 11 illustrates an XRD spectrum of the porous amorphous silicon shown in FIG. 8.

Figure 12:
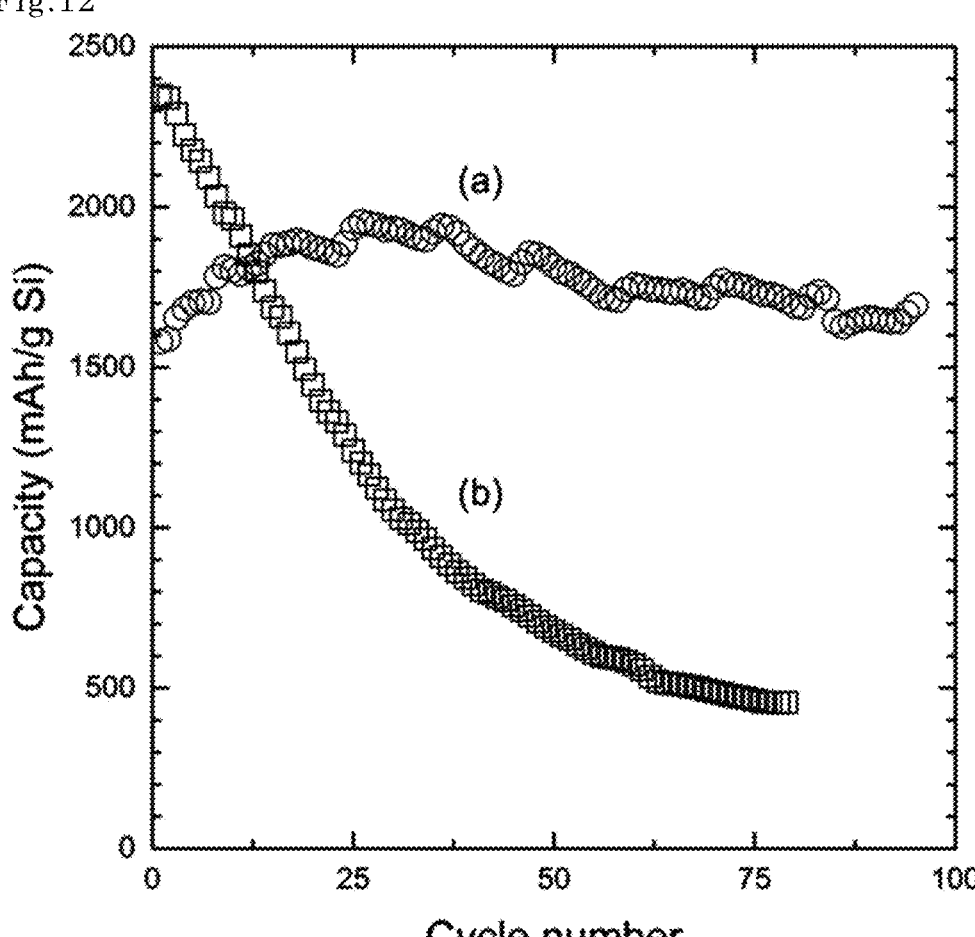

FIG. 12 is a graph showing the test results of the evaluation of battery cycle properties of (a) a lithium ion battery using the porous amorphous silicon shown in FIG. 1 as the anode material; and (b) a lithium ion battery using crystalline Si particles of Comparative Example as the anode material.

DETAILED DESCRIPTION OF THE INVENTION

Embodiments of the present invention will be described below with reference to Examples.

The porous amorphous silicon according to an embodiment of the present invention has a lamellar or columnar structure having a mean lamellar diameter or a mean column diameter of 1 nm to 100 nm. The porous amorphous silicon according to an embodiment of the present invention has a lamellar structure having a spacing between adjacent lamellae of 1 nm to 100 nm or a columnar structure having a spacing between adjacent columns of 1 nm to 100 nm. The porous amorphous silicon according to an embodiment of the present invention is suitably produced by the method for producing a porous amorphous silicon according to an embodiment of the present invention.

In the method for producing a porous amorphous silicon according to an embodiment of the present invention, first, a molten metal containing metal and silicon is cooled at a cooling rate of $10^6$ K/sec or more to form an eutectic alloy comprising the metal and the silicon. Subsequently, the metal is selectively eluted from the eutectic alloy with an acid or an alkali. This makes it possible to obtain a porous amorphous silicon.

In the method for producing a porous amorphous silicon according to an embodiment of the present invention, the eutectic alloy may be produced, for example, by a single roll rapid quenching method or a twin roll rapid quenching method. In this case, the eutectic alloy to be produced preferably has a ribbon or foil shape having a mean thickness of 0.1 μm to 1 mm. The eutectic alloy may also be produced by a gas atomization method or a water atomization method. In this case, the eutectic alloy to be produced preferably has a powder shape having a mean particle diameter of 10 nm to 30 μm.

In the method for producing a porous amorphous silicon according to an embodiment of the present invention, the eutectic alloy may be, for example, an Al—Si alloy. In this case, the eutectic alloy preferably contains an atomic percentage of Si between 1% to 50%. This makes it possible to produce a porous amorphous silicon having a mean porosity of 50% to 99%. The eutectic alloy may be an Fe—Si alloy, an Ni—Si alloy, a Cr—Si alloy, an Ag—Si alloy or a Cu—Si alloy. In this case, the eutectic alloy preferably contains an atomic percentage of Si between 50% to 90%. This makes it possible to produce a porous amorphous silicon having a mean porosity of 10% to 50%.

The eutectic alloy may be a two- or multi-component eutectic alloy represented by $M_1$-Si ($M_1$ represents one or more elements selected from Al, Ag, As, Au, Be, Ca, Cr, Cu, Mg, Pd, Pt, Y, Co, Fe, Mn, Ti and Zr), or a three- or multi-component eutectic alloy represented by $M_2$-Al—Si ($M_2$ represents one or more elements selected from Ca, Cu, Ge, P, Mn, Na, Sb, Sn, Sc, Sr and Ti). The eutectic alloy may also be an amorphous alloy.

The actions will be described below.

In the method for producing a porous amorphous silicon according to an embodiment of the present invention, a molten metal containing metal and silicon is cooled at a cooling rate of $10^6$ K/sec or more when an eutectic metal is formed, thus making it possible to adjust a domain size of a silicon phase in the structure of the eutectic alloy in a range of 1 nm to 100 nm, and to adjust a domain size of a metal phase in the structure of the eutectic alloy in a range of 1 nm to 100 nm. The selective elution of the metal from this eutectic alloy makes it possible to produce a porous amorphous silicon according to an embodiment of the present invention which has a mean lamellar diameter or a mean column diameter of 1 nm to 100 nm and has a lamellar structure having a spacing between adjacent lamellae of 1 nm to 100 nm or a columnar structure having a spacing between adjacent columns of 1 nm to 100 nm.

The method for producing a porous amorphous silicon according to the present invention is capable of producing a porous amorphous silicon composed entirely of amorphous silicon by cooling a molten metal at a cooling rate of $10^6$ K/sec or more. Further increase in cooling rate enables the domain size of a silicon phase in the structure of the eutectic alloy to be reduced to a range of 1 nm to 50 nm, thus producing a porous amorphous silicon having a mean lamellar diameter or a mean column diameter of 1 nm to 50 nm.

Since the method for producing a porous amorphous silicon according to the present invention comprises the steps of rapid quenching a molten metal and eluting metal with an acid or an alkali, a porous amorphous silicon can be produced at relatively low costs in a short time without using an expensive device. Silicon having the highest Clarke number excluding oxygen is used as the material, and a porous amorphous silicon can be produced at low cost by using metal having higher Clarke number, such as aluminum. Therefore, this makes it easy to economically scale up for mass production.

Since the porous amorphous silicon according to the present invention is composed of a sufficiently grown porous amorphous silicon, it is possible to improve battery performances such as charge/discharge efficiency and battery capacity when used as the anode material. When the porous amorphous silicon according to the present invention is used as the anode material for lithium ion batteries, even if silicon is alloyed with lithium to cause volume expansion, there is almost no change in appearance because expansion occurs to fill pores of holes. The porous amorphous silicon according to an embodiment of the present invention can have both high strength and high elasticity compared to a crystalline substance, and is resistant to the volume expansion when silicon is alloyed with lithium. As mentioned above, when the porous amorphous silicon according to the present invention is used as the anode material for lithium ion batteries, it is possible to prevent the anode material from being pulverized.

The porous amorphous silicon according to the present invention is not limited to the anode material for lithium ion batteries, and can also be used as thermoelectric materials, solar batteries, electronic device members, filter materials and optical materials. The porous amorphous silicon according to the present invention preferably has a bicontinuous structure. It is preferable that the porous amorphous silicon according to the present invention is amorphous silicon having a three-dimensional network structure and also includes continuous pores. The ratio of silicon is preferably 90% or more in terms of a ratio of an element excluding oxygen.

Example 1

Using the method for producing a porous amorphous silicon according to an embodiment of the present invention, a porous amorphous silicon was produced. First, silicon (massive, purity of 99.999% or higher) was mixed with aluminum at a ratio of Si:Al=20:80 (atomic %) and the mixture was arc-melted in a vacuum furnace in a state of being purged with argon gas to obtain a molten metal. Using a single roll caster, a ribbon-shaped Al—Si alloy having a thickness of about 15 μm was fabricated from the molten metal by a single roll rapid quenching method. This Al—Si alloy is an eutectic alloy comprising Al and Si. This Al—Si alloy was immersed in hydrochloric acid having the concentration of 5 N at a temperature of 60° C. for 24 hours to elute Al, thus producing a porous body composed of silicon.

Figure 2:
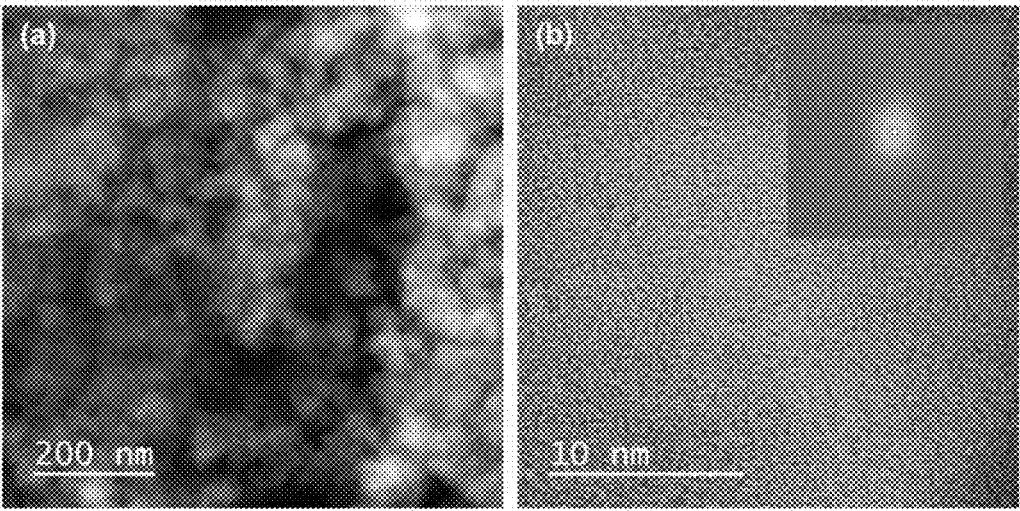
FIG. 2 includes (a) an electron transmission microscopic (TEM) photograph; and (b) a TEM photograph taken at a higher magnification than that of (a) and a Fourier-transformed image (inserted figure); of the porous amorphous silicon shown in FIG. 1.

A scanning electron microscopic (SEM) photograph and an electron transmission microscopic (TEM) photograph of the porous body thus obtained are respectively shown in FIG. 1 and FIG. 2. FIG. 2(b) shows, as an inserted figure, a Fourier-transformed image of a TEM photograph. As shown in FIG. 1 and FIG. 2, the substance thus obtained has a porous structure having a mean lamellar diameter and a mean column diameter of about 10 nm, and particularly it has been confirmed from FIG. 1(c) that the substance has a lamellar structure of about 10 nm. It has also been confirmed that the lamellar structure had a spacing between adjacent lamellae of several tens of nm or less. It has been confirmed that the substance is amorphous since the Fourier-transformed image in FIG. 2(b) exhibits a halo pattern.

The measurement results by an X-ray diffraction (XRD) method of the porous body thus obtained are shown in FIG. 5(a). The measurement results by an X-ray diffraction (XRD) method of a commercially available crystalline substance Si nanopowder as Comparative Example are shown in FIG. 5(d). As shown in FIG. 5(a), it has been confirmed that the porous body thus obtained is not a crystalline substance but amorphous since an XRD spectrum has no sharp peaks and exhibits a gentle shape. The above results reveal that the substance shown in FIG. 1 and FIG. 2 is a porous amorphous silicon.

Example 2

Silicon (massive, purity of 99.9% or higher) was mixed with aluminum at a ratio of Si:Al=20:80 (atomic %) and the mixture was arc-melted in a vacuum furnace in a state of being purged with argon gas to obtain a molten metal at 1,400° C. Using the gas atomizer shown in Patent Literature 2, the molten metal was ground by helium gas under 10 MPa to fabricate an Al—Si alloy powder having a particle diameter of about 10 μm or less. This Al—Si alloy is an eutectic alloy comprising Al and Si. This Al—Si alloy was immersed in hydrochloric acid having the concentration of 5 N at a temperature of 60° C. for 24 hours to elute Al, thus producing a porous body composed of silicon.

Figure 3:
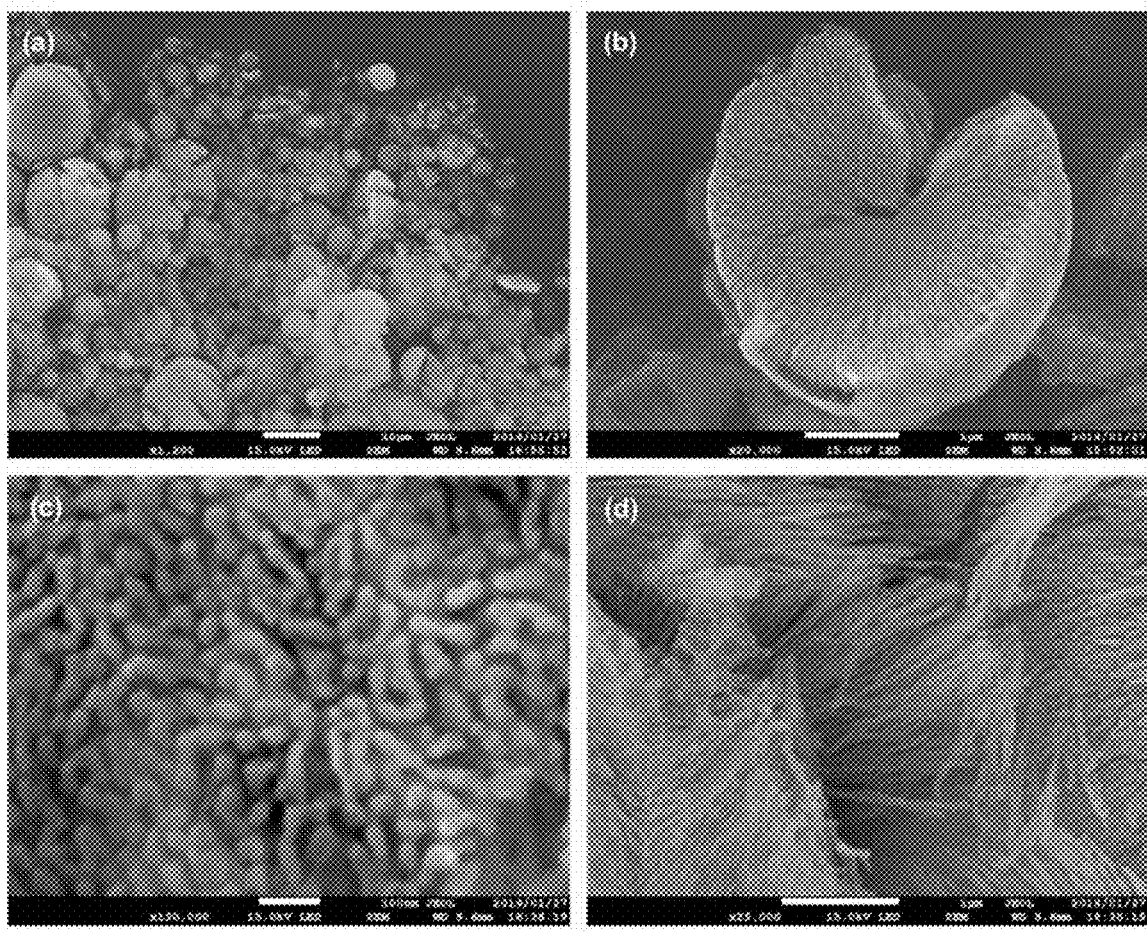
FIG. 3 includes (a) a scanning electron microscopic (SEM) photograph, (b) a SEM photograph taken at a higher magnification than that of (a); (c) a SEM photograph taken at a higher magnification than that of (b); and (d) a SEM photograph of the part different from that of (b) taken at a higher magnification than that of (a); of a porous amorphous silicon produced using an Al—Si alloy powder, which is fabricated by mixing at a ratio of Si:Al=20:80 (atomic %) through gas atomization using He gas, by the method for producing a porous amorphous silicon according to an embodiment of the present invention.

A scanning electron microscopic (SEM) photograph of the porous body thus obtained is shown in FIG. 3. As shown in FIG. 3, it has been confirmed that the substance thus obtained has a porous lamellar structure having a mean lamellar diameter and a mean column diameter of about 20 to 30 nm (see FIG. 3(b) and FIG. 3(c)) and a columnar structure having a mean column diameter of about 100 nm (see FIG. 3(d)). It has also been confirmed that the lamellar structure has a spacing between adjacent lamellae of several tens of nm or less and the columnar structure has a spacing between adjacent columns of 100 nm or less. The columnar structure shown in FIG. 3(d) has a length of about 1 μm and an aspect ratio of about 10.

The measurement results by an X-ray diffraction (XRD) method of the porous body thus obtained are shown in FIG. 5(b). As shown in FIG. 5(b), it has been confirmed that the porous body thus obtained is almost entirely amorphous since a slight peak appears on the wide-angle side, but an XRD spectrum has no sharp peak and exhibits almost gentle shape. The above results reveal that the substance shown in FIG. 3 is a porous amorphous silicon.

Example 3

Silicon (massive, purity of 99.9% or higher) was mixed with aluminum and titanium at a ratio of Si:Al:Ti=19.5:79.5: 1.0 (atomic %) and the mixture was arc-melted in a vacuum furnace in a state of being purged with argon gas to obtain a molten metal at 1,400° C. Using the gas atomizer shown in Patent Literature 2, the molten metal was ground by helium gas under 10 MPa to fabricate an Al—Si—Ti alloy powder having a particle diameter of about 10 μm or less. This Al—Si—Ti alloy is an eutectic alloy comprising Al, Si and Ti. This Al—Si—Ti alloy was immersed in hydrochloric acid having the concentration of 5 N at a temperature of 60° C. for 24 hours to elute Al and Ti, thus producing a porous body composed of silicon.

A scanning electron microscopic (SEM) photograph of the porous body thus obtained is shown in FIG. 4. As shown in FIG. 4, it has been confirmed that the substance thus obtained has a porous lamellar structure having a mean lamellar diameter and a mean column diameter of about 80 to 100 nm or less. It has also been found that the lamellar structure has a spacing between adjacent lamellae of 50 nm or less.

The measurement results by an X-ray diffraction (XRD) method of the porous body thus obtained are shown in FIG. 5(c). As shown in FIG. 5(c), it has been confirmed that the porous body thus obtained is not a crystalline substance but amorphous since an XRD spectrum has no sharp peak and exhibits a gentle shape. The above results reveal that the substance shown in FIG. 4 is a porous amorphous silicon.

Example 4

Silicon (massive, purity of 99.9% or higher) was mixed with aluminum at various ratios to fabricate an eutectic alloy and then Al was eluted to produce a porous body composed of silicon. A mixing ratio of Si and Al included the following four types: [Si:Al]=[3:97], [12.5:87.5], [30:70] and [40:60] (atomic %). In the case of [Si:Al]=[3:97], an eutectic alloy was fabricated by a gas atomization method using He gas. In the case of [Si:Al]=[12.5:87.5], an eutectic alloy was fabricated by a gas atomization method using Ar gas. In the case of the following three types: [Si:Al]=[12.5:87.5], [30:70] and [40:60], an eutectic alloy was fabricated by a single roll rapid quenching method.

When using the gas atomization method, like Example 2, first, a mixture obtained by mixing Si and Al at a predetermined ratio was arc-melted in a vacuum furnace in a state of being purged with argon gas, and then the molten metal was ground by He gas or Ar gas under 10 MPa using the gas atomizer shown in Patent Literature 2 to fabricate an eutectic alloy composed of an Al—Si alloy powder having a particle diameter of about 10 μm or less. When using the single roll rapid quenching method, like Example 1, first, a mixture obtained by mixing Si and Al at a predetermined ratio was arc-melted in a vacuum furnace in a state of being purged with argon gas, and then an eutectic alloy composed of a ribbon-shaped Al—Si alloy having a thickness of about 15 μm was fabricated from the molten metal using a single roll caster. The eutectic alloy fabricated by each method was immersed in hydrochloric acid having the concentration of 5 N at a temperature of 60° C. for 24 hours to elute Al, thus producing a porous body composed of silicon.

Scanning electron microscopic (SEM) photographs of each porous body thus obtained are respectively shown in FIG. 6 to FIG. 10. As shown in FIG. 6, it has been confirmed that the porous body obtained by mixing at a ratio of [Si:Al]=[3:97] through the gas atomization method using He gas has a columnar structure having a mean column diameter of about 100 nm (see FIG. 6(d)).

As shown in FIG. 7, it has been confirmed that the porous body obtained by mixing at a ratio of [Si:Al]=[12.5:87.5]

through a gas atomization method using Ar gas has a porous lamellar structure having a mean lamellar diameter and a mean column diameter of about 100 nm (see FIG. 7(c)). It has also been confirmed that the lamellar structure has a spacing between adjacent lamellae of about 100 nm. As shown in FIG. 8, it has been confirmed that the porous body obtained by mixing at the same ratio of [Si:Al]=[12.5:87.5] through a single roll rapid quenching method has a columnar structure having a mean column diameter of about 100 nm or less (see FIG. 8(b)). The measurement results by an X-ray diffraction (XRD) method of this porous body are shown in FIG. 11. As shown in FIG. 11, it has been confirmed that the porous body thus obtained is not a crystalline substance but amorphous since an XRD spectrum has no sharp peaks and exhibits a gentle shape. These results reveal that the substance shown in FIG. 8 is a porous amorphous silicon.

As shown in FIG. 9, it has been confirmed that the porous body obtained by mixing at a mixing ratio of [Si:Al]=[30:70] through a single roll rapid quenching method has a porous lamellar structure having a mean lamellar diameter and a mean column diameter of about several tens of nm (see FIG. 9(b)). It has also been confirmed that the lamellar structure has a spacing between adjacent lamellae of several tens of nm or less.

As shown in FIG. 10, it has been confirmed that the porous body obtained by mixing at a mixing ratio of [Si:Al]=[40:60] through a single roll rapid quenching method has a porous lamellar structure having a mean lamellar diameter and a mean column diameter of about 100 nm or less (see FIG. 10(b)). It has also been confirmed that the lamellar structure has a spacing between adjacent lamellae of several tens of nm or less.

Example 5

A lithium ion battery using the porous amorphous silicon shown in FIG. 1 and FIG. 2 as the anode material was produced, and then a test for the evaluation of cycle properties of the battery was performed. First, porous amorphous silicon particles, a carbon black conductive assistant and a polyimide binder were dispersed in N-methyl-2-pyrrolidone to obtain a uniform slurry. The slurry was unfirmly coated on a rolled copper foil so that a coating amount became about 1 to 2 mg/cm$^2$, and then dried and solidified by heating in a vacuum at 450° C. Using this coated rolled copper foil as an anode, pure lithium as a counter electrode, and a solution having a concentration of 1 mol/liter prepared by dissolving lithium hexafluorophosphate in fluoroethylene carbonate as an electrolyte, a 2032 coin type half-cell battery was produced. A lithium ion battery using crystalline Si particles having a diameter of 100 nm as an anode material was also produced as Comparative Example.

With respect to each lithium ion battery thus produced, the delithiation capacity at each cycle was measured by repeating charge/discharge cycle for 100 cycles at a current density of 0.5 C for a porous amorphous silicon electrode and 0.25 C (1 C is 3,579 mA/g) for crystalline silicon particles at a voltage in a range of 0.005 V to 1 V. The measurement results are shown in FIG. 12. As shown in FIG. 12, it has been confirmed that the battery using the porous amorphous silicon exhibited the maximum capacity of about 2,000 mAh/g Si and the capacity of 1,600 to 1,700 mAh/g Si after 100 cycles, and a decrease in capacity is suppressed to about 15 to 20% even after 100 cycles. To the contrary, it has been confirmed that, in the case of the battery using crystalline Si particles of Comparative Example, the original maximum capacity of about 2,350 mAh/g Si is decreased to 500 mAh/g Si or less after 80 cycles. As mentioned above, it is possible to say that the lithium ion battery using the porous amorphous silicon as the anode material has satisfactory cycle properties and high battery capacity.

What is claimed is:

1. A porous amorphous silicon which has a lamellar structure having a mean lamellar diameter of 1 nm to 100 nm and which has a bicontinuous structure,
   wherein the porous amorphous silicon has a three-dimensional network structure, includes continuous pores, and has a mean porosity of 50% to 99%.

2. The porous amorphous silicon according to claim 1, which has a lamellar structure having a spacing between adjacent lamellae of 1 nm to 100 nm.

3. The porous amorphous silicon according to claim 1, wherein the mean lamellar diameter is 1 nm to 50 nm.

4. The porous amorphous silicon according to claim 1, obtained by a method comprising cooling a molten metal containing metal and silicon at a cooling rate of $10^6$ K/sec or more to form an eutectic alloy comprising the metal and the silicon, and selectively eluting the metal from the eutectic alloy with an acid or an alkali to obtain a porous amorphous silicon.

5. A secondary battery whose anode material comprises the porous amorphous silicon according to claim 1.

6. A method for producing a porous amorphous silicon, which comprises cooling a molten metal containing metal and silicon at a cooling rate of $10^6$ K/sec or more to form an eutectic alloy comprising the metal and the silicon, and selectively eluting the metal from the eutectic alloy with an acid or an alkali to obtain a porous amorphous silicon.

7. The method for producing a porous amorphous silicon according to claim 6, wherein the eutectic alloy is produced by a single roll rapid quenching method or a twin roll rapid quenching method, and has a ribbon or foil shape having a mean thickness of 0.1 μm to 1 mm.

8. The method for producing a porous amorphous silicon according to claim 6, wherein the eutectic alloy is produced by a gas atomization method or a water atomization method, and has a powder shape having a mean lamellar diameter of 10 nm to 30 μm.

9. The method for producing a porous amorphous silicon according to claim 6, wherein a phase of the silicon in the structure of the eutectic alloy has a domain size of 1 nm to 100 nm.

10. The method for producing a porous amorphous silicon according to claim 6, wherein a phase of the metal in the structure of the eutectic alloy has a domain size of 1 nm to 100 nm.

11. The method for producing a porous amorphous silicon according to claim 6, wherein a phase of the silicon in the structure of the eutectic alloy has a domain size of 1 nm to 50 nm.

12. The method for producing a porous amorphous silicon according to claim 6, wherein the eutectic alloy is an Al—Si alloy.

13. The method for producing a porous amorphous silicon according to claim 12, which contains an atomic percentage of Si between 1% to 50%.

14. The method for producing a porous amorphous silicon according to claim 6, wherein the eutectic alloy is an Fe—Si alloy, an Ni—Si alloy, a Cr—Si alloy, an Ag—Si alloy or a Cu—Si alloy.

15. The method for producing a porous amorphous silicon according to claim 14, which contains an atomic percentage of Si between 50% to 90%.

16. The method for producing a porous amorphous silicon according to claim 6, wherein the eutectic alloy is a two- or multi-component eutectic alloy represented by $M_1$-Si ($M_1$ represents one or more elements selected from Al, Ag, As, Au, Be, Ca, Cr, Cu, Mg, Pd, Pt, Y, Co, Fe, Mn, Ti and Zr).

17. The method for producing a porous amorphous silicon according to claim 6, wherein the eutectic alloy is a three- or multi-component eutectic alloy represented by $M_2$-Al—Si ($M_2$ represents one or more elements selected from Ca, Cu, Ge, P, Mn, Na, Sb, Sn, Sc, Sr and Ti).

\* \* \* \* \*